(No Model.)
E. C. F. OTTO.
ELASTIC TIRE FOR WHEELS.
No. 358,291. Patented Feb. 22, 1887.
FIG:1     FIG:2.
 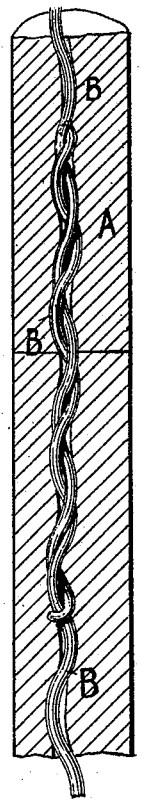
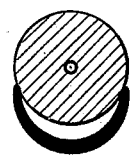
FIG.4
FIG.3.  FIG.5. 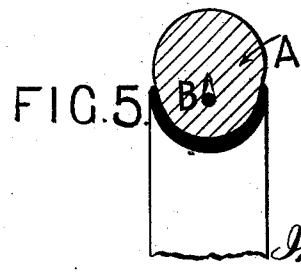

UNITED STATES PATENT OFFICE.

EDWARD C. F. OTTO, OF PECKHAM, COUNTY OF SURREY, ENGLAND.

ELASTIC TIRE FOR WHEELS.

SPECIFICATION forming part of Letters Patent No. 358,291, dated February 22, 1887.

Application filed July 14, 1886. Serial No. 208,020. (No model.)

*To all whom it may concern:*

Be it known that I, EDWARD CHARLES FREDERICK OTTO, a subject of the Queen of Great Britain, residing at Peckham, in the county of Surrey, England, have invented a certain new and useful Improved Method of Securing Elastic Tires to Wheel-Rims, of which the following is a specification.

My improved method of securing india-rubber or other suitable tires in or to wheel-rims is especially adapted for velocipedes and other light vehicles, and obviates the liability of such tires becoming loose.

According to my invention I insert through the center of the tire, throughout its whole length, a steel or other wire of an elongated spiral-spring form or shape, thereby producing a spring of such shape or form; or the wire may be simply corrugated, as in my elastic spokes for which Letters Patent in the United States of America have been granted to me, dated December 16, 1884, No. 309,355. I prefer to connect the ends of this wire (after forcing upon it as great a length of tire as possible) by twisting said ends (preferably at least two or more inches of same) in such manner that the corrugations are locked at right angles. By means of this locking it is quite impossible for the ends to part or to become relaxed, while the spring of the wire allows sufficient elasticity for the tire to be forced over the flange into the groove of the rim and firmly holds it there. The grip may be varied by the strength of the spring or the size of the corrugations of the wire.

The corrugated wire is sufficient to hold the tire securely in the rim; but a coating of cement in the groove is advantageous to prevent wet and dirt getting between the rim and the tire.

The rubber is compressed, according to this invention, instead of being stretched, as in the ordinary method of fixing. Consequently, if cut or injured on the road, it closes up and returns to its normal state.

The accompanying drawings fully illustrate the manner in which I prefer to carry my invention into effect.

Figure 1 is a sectional elevation of a piece of india-rubber tire, showing in front elevation the two ends of the elongated spring-wire united or connected together in the manner before described. Fig. 2 shows a similar piece of tire with a perspective view of the wire ends as they would appear when twisted together; and Fig. 3 is a vertical cross section of an india-rubber tire before the insertion of the wire, Fig. 4 showing such a tire before being drawn or squeezed into the rim; and Fig. 5 is a vertical cross-section of the tire and wire, showing same when on the rim of wheel.

Similar letters of reference refer to like parts in all the figures.

A is the india-rubber tire. B is the wire, corrugated and united at the ends, as shown. A plain wire, corrugated at the end, is first pushed through the hole in the tire. The corrugated wire is then connected to the corrugated end of the plain wire, which is then drawn through the central aperture of a length of rubber tire, which is preferably longer than would be required for a given-sized wheel if it were intended to be applied thereto in an uncompressed state. The elastic tire is then condensed in length while upon the wire B, and the ends of the wire B are then secured together in the manner before described, the length of the said wire when joined being such that it can be "sprung" or "jumped" over the edge or flange of the rim of the wheel, the springing action of the wire allowing of this operation. The two ends of the rubbers are first drawn and closed together, the compression of the tire effectually keeping same closed; and before closing I may insert some binding cement. The spring contraction of wire will cause the hole or aperture in the tire to assume a shape somewhat similar to that illustrated at Fig. 5, and the corrugated wire will sink deep in the groove and heave up the outer surface of the tire, thus giving a greater elastic cushion to the wheel than heretofore.

As the results of my invention I condense the whole rubber tire to such a degree that even the ends are closed by its own pressure when joined, and every cut that may be made in its circumference will close up.

The corrugation of this wire holds the rubber so firmly in position in every part of the periphery that it cannot shift from one part to another, and therefore cannot become cut. By the spring-like nature of the wire the tire, although most securely held into the rim, can be taken off for repairs without breaking the wire or injuring the tire, although to accomplish this great power is required, it being generally advisable to employ mechanical power.

I am aware that before my invention both plain and wavy or corrugated wire has been formed into a ring with the ends joined and a rubber tire molded around the same and cured; and I am also aware that both solid and tubular tires have been compressed into the rim of a wheel, but these latter were employed without any corrugated or wavy wire.

My improved tubular tire, as heretofore described, is considerably compressed longitudinally after the corrugated or wavy spring-wire has been drawn through it and before the ends of said wire are united, and the relative sizes of the tire and the wheel it is intended to fit are such that when the tire has been sprung to place in the felly of the wheel the rubber will still be in a compressed condition longitudinally, which is sufficient to prevent it cutting easily and when cut to prevent the cut from opening, and the rubber of the tire can accommodate itself lengthwise upon the wire, so that its density is maintained equally under all degrees of tension, whereas in the tires previously made, in which a spring-wire was molded, the tire was made smaller than the wheel in its normal condition, and when sprung into the felly of the wheel the rubber was stretched and under tension, and it was more liable to cut and when cut to spread and open, than in my improvement.

I claim as my invention—

An elastic wheel-tire composed of a tubular rubber, a corrugated or wavy spring-wire drawn through the rubber tube and the ends of said wire joined, the rubber being under compression lengthwise upon the wire, substantially as specified.

E. C. F. OTTO.

Witnesses:
   F. BARBER,
      33 *Chancery Lane, London.*
   T. J. OSMAN,
      28 *Southampton Buildings, London.*